US010464678B2

United States Patent
Brunaux et al.

(10) Patent No.: US 10,464,678 B2
(45) Date of Patent: Nov. 5, 2019

(54) SAFETY BELT, NOTABLY FOR AIRCRAFT SEAT

(71) Applicant: Safran Seats, Plaisir (FR)

(72) Inventors: Yannick Brunaux, Croix (FR); Alison Gill, Toulouse (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 15/747,949

(22) PCT Filed: Jul. 29, 2016

(86) PCT No.: PCT/EP2016/068245
§ 371 (c)(1),
(2) Date: Apr. 10, 2018

(87) PCT Pub. No.: WO2017/017278
PCT Pub. Date: Feb. 2, 2017

(65) Prior Publication Data
US 2018/0208318 A1    Jul. 26, 2018

Related U.S. Application Data

(60) Provisional application No. 62/198,316, filed on Jul. 29, 2015.

(51) Int. Cl.
*B64D 11/06* (2006.01)
*B60R 22/48* (2006.01)
(Continued)

(52) U.S. Cl.
CPC ...... *B64D 11/062* (2014.12); *B60R 21/01544* (2014.10); *B60R 22/12* (2013.01);
(Continued)

(58) Field of Classification Search
CPC . B64D 11/062; B60R 21/01544; B60R 22/12; B60R 22/48; B60R 2022/4816; B60R 2022/485
(Continued)

(56) References Cited

U.S. PATENT DOCUMENTS 5,086,785 A    2/1992  Gentile et al.
6,737,862 B1   5/2004  Godoy et al.
(Continued)

FOREIGN PATENT DOCUMENTS

EP    2052923    4/2009

OTHER PUBLICATIONS

International Patent Application No. PCT/EP2016/068245, International Search Report and Written Opinion, dated Oct. 10, 2016.
(Continued)

*Primary Examiner* — Daryl C Pope
(74) *Attorney, Agent, or Firm* — Kilpatrick Townsend & Stockton LLP; Dean W. Russell; Tiffany L. Williams

(57) ABSTRACT

A safety belt is intended to be installed on an aircraft seat and includes a first part and a second part which are able to be joined together by means of a buckle to hold the passenger on the seat. The safety belt may also include a status detection system able to transmit information relating to the fastening status of the safety belt, a presence detection system able to transmit information relating to the presence of a passenger wearing the safety belt, and/or a communications module, notably wireless, able to transmit information relating to the fastening of the safety belt and/or to the presence of a passenger wearing the safety belt.

25 Claims, 6 Drawing Sheets

(51) Int. Cl.
*B60R 22/12* (2006.01)
*B60R 21/015* (2006.01)

(52) U.S. Cl.
CPC ........ *B60R 22/48* (2013.01); *B60R 2022/485* (2013.01); *B60R 2022/4816* (2013.01)

(58) Field of Classification Search
USPC ................. 340/457.1, 539.1, 539.11, 539.13
See application file for complete search history.

(56) References Cited

U.S. PATENT DOCUMENTS

| | | |
|---|---|---|
| 2009/0093932 A1 | 4/2009 | McCall et al. |
| 2009/0177357 A1 | 7/2009 | Long et al. |
| 2009/0322507 A1 | 12/2009 | Aoki et al. |
| 2010/0071483 A1 | 3/2010 | Koors et al. |
| 2010/0253498 A1 | 10/2010 | Rork et al. |
| 2010/0283593 A1* | 11/2010 | Miller ................ B60C 23/0408 340/447 |

OTHER PUBLICATIONS

International Patent Application No. PCT/EP2016/068245, English Translation of the Written Opinion of the International Searching Authority, dated Jan. 30, 2018.

\* cited by examiner

SAFETY BELT, NOTABLY FOR AIRCRAFT SEAT

CROSS-REFERENCE TO RELATED APPLICATIONS

This application is a national phase entry under 35 USC § 371 of International Application PCT/EP2016/068245 ("the '245 application"), filed Jul. 29, 2016, and entitled SAFETY BELT, NOTABLY FOR AIRCRAFT SEAT, which claims the benefit of U.S. Provisional Application No. 62,198/316 ("the '316 application"), filed on Jul. 29, 2015, and entitled SMART SEAT BELT. The '245 application and the '316 application are hereby incorporated in their entireties by this reference.

FIELD OF THE INVENTION

The present invention relates to a safety belt, notably a safety belt for an aircraft seat.

The invention is intended to propose a safety belt that is called "connected" because, in addition to its function of retaining the body of a passenger on a seat to ensure his safety, it allows the provision and/or transmission of, notably, an item of information relating to the state of locking of the safety belt and/or to the presence of a passenger encircled by the safety belt. The invention is adaptable to any type of seat, particularly the economy, business, and first class seats in an aircraft.

The present invention may also be applied to the field of transportation vehicles (cars, buses, trains, etc.) in which safety belts have to be used.

BACKGROUND

In the field of aircraft, the known mechanisms for closing a safety belt are standard for almost all commercial flights. These standard mechanisms comprise, in a known way, a buckle formed by a male element and a female element capable of interacting with one another to lock the belt. The male element and/or the female element may slide relative to a corresponding strap to adapt the belt to the morphology of the passenger. Such belts do not have a system for automatically detecting their locking.

Their locking is therefore usually checked by on-board personnel, notably in the parking, take-off and landing phases of the aircraft, but also in case of turbulence and/or an emergency situation. However, such visual checks are time-consuming and cannot provide certainty as to whether the passenger has detached his safety belt immediately after the check made by the on-board personnel. There are also possible errors due to such visual checks made by a human being.

Some automated monitoring systems have been proposed to overcome the aforementioned problems. However, these automated monitoring systems require the installation of power sources and dedicated network links, which necessitate a modification of, and/or an increase in, the overall dimensions of the seat, so that the seat can be adapted to the intrusive nature of such automated monitoring systems.

Moreover, although some known devices, such as that described in the document U.S. Pat. No. 6,737,862, can detect the locking of the safety belt, they cannot distinguish the presence of a person relative to that of an object, or discriminate the position of a locked safety belt located above or below the passenger, in a case where the passenger is sitting on the safety belt.

SUMMARY OF THE INVENTION

The invention is intended to overcome these drawbacks in an effective way by proposing a safety belt, particularly one to be installed on an aircraft seat, comprising a first part and a second part that can be attached to one another by means of a locking buckle to retain the passenger on the seat, characterized in that it further comprises:

- a state detection system, capable of transmitting an item of information relating to a locking state of the safety belt, and/or
- a presence detection system, capable of transmitting an item of information relating to the presence of a passenger encircled by the safety belt, and/or
- a communication module, notably of the wireless type, capable of transmitting an item of information relating to the locking of the safety belt and/or the presence of a passenger encircled by the safety belt.

Thus the invention proposes a non-intrusive, user-friendly, autonomous system for monitoring the locking state of the passenger's belt, while ensuring that the person is correctly placed behind the belt.

The invention can significantly reduce the duration of the procedure for checking the belt locking, because of the centralization of visual checking by the on-board personnel.

The invention also supplies a belt state that the on-board personnel can check at any moment and in real time via the communication, preferably wireless communication, between the belts and a corresponding monitoring system.

The invention is also economical in nature, since the installation of the wireless module does not require any modification of the seat or its environment (the cabin floor or ceiling) for the passage of dedicated network cables.

According to one embodiment, the safety belt comprises an electrical power source so as to be electrically autonomous.

According to one embodiment, the system for detecting the locking state of the safety belt, the presence detection system and/or the communication module are fitted in the first and/or the second part of the safety belt and/or inside the locking buckle of the safety belt.

According to one embodiment, the presence detection system is configured to be switched on after the detection of the locking of the safety belt. This enables the power consumption of the system to be minimized.

According to one embodiment, the presence detection system comprises at least one sensor, an electrical resistance of which varies as a function of a curvature of the first part and/or the second part of the safety belt.

According to one embodiment, the sensor is positioned in a space provided in a weave of the first part and/or the second part of the safety belt.

According to one embodiment, the sensor is integrated into the first part and/or the second part of the safety belt.

According to one embodiment, the sensor extends over a distance of between 30% and 100%, or preferably between 30% and 70%, of the total length of the first part and/or the second part of the safety belt.

According to one embodiment, the sensor is made of a piezoresistive material.

According to one embodiment, the presence detection system comprises a transmitter and a receiver, fitted in the first part and/or the second part of the safety belt, respectively, to generate an electric field.

According to one embodiment, the transmitter and the receiver are located at the ends of the safety belt.

According to one embodiment, the transmitter and the receiver are located at a distance of between 5 cm and 20 cm from interfaces for fastening the safety belt to a seat structure. This makes it possible to avoid interference between the signals and a metal portion of any belt worn by the passenger to hold up an item of clothing.

According to one embodiment, the transmitter and receiver are positioned in a space provided in a weave of the first part and/or the second part of the safety belt.

According to one embodiment, the presence detection system comprises at least one accelerometer.

According to one embodiment, the accelerometer is integrated into the locking buckle.

According to one embodiment, the presence detection system comprises a module for comparing signals transmitted by the accelerometer for a free seat, a seat on which an object is placed, and a seat occupied by a passenger, from which a vibration signature for the aircraft in operation has previously been subtracted.

According to one embodiment, the accelerometer is coupled to a rate gyroscope for the additional measurement of an angle formed between the locking buckle and a seat cushion of the seat and/or a horizontal reference frame.

According to one embodiment, the presence detection system comprises a transmitter and a receiver fitted in the locking buckle, the receiver being capable of receiving a magnetic field reflected by the seat back, which is made of a metal material.

According to one embodiment, the communication module is a low-consumption module incorporating a power management strategy for switching different components of said communication module on and off so as to minimize its power consumption.

According to one embodiment, the communication module belongs to a mesh network. This enables secure, redundant network communication to be established within the aircraft cabin.

According to one embodiment, the locking buckle comprises a male element and a female element, the system for detecting the state of the safety belt comprising:
 a receiving member arranged in the male element or the female element of the locking buckle respectively, and
 a transmitting member arranged in the female element or the male element, respectively, of the locking buckle.

According to one embodiment, transmitting member is an RFID chip.

According to one embodiment, the state detection system comprises a magnetic switch.

According to one embodiment, the magnetic switch comprises:
 a magnet integrated into a male element or a female element of the locking buckle, respectively, and
 a contactor integrated into the female element or the male element, respectively, of the locking buckle.

The invention also relates to a seat comprising a safety belt such as that defined above.

Clearly, the different characteristics, variants and/or embodiments of the present invention may be associated with one another in various combinations, provided that they are not incompatible or mutually exclusive.

BRIEF DESCRIPTION OF THE DRAWINGS

The present invention will be more clearly understood, and other characteristics and advantages will be more apparent, from a perusal of the following detailed description which comprises embodiments provided for illustrative purposes with reference to the attached drawings, provided by way of non-limiting example, which may provide a fuller understanding of the present invention and the description of its embodiment and may contribute to its definition if necessary, in which drawings.

DETAILED DESCRIPTION

Figure 1:
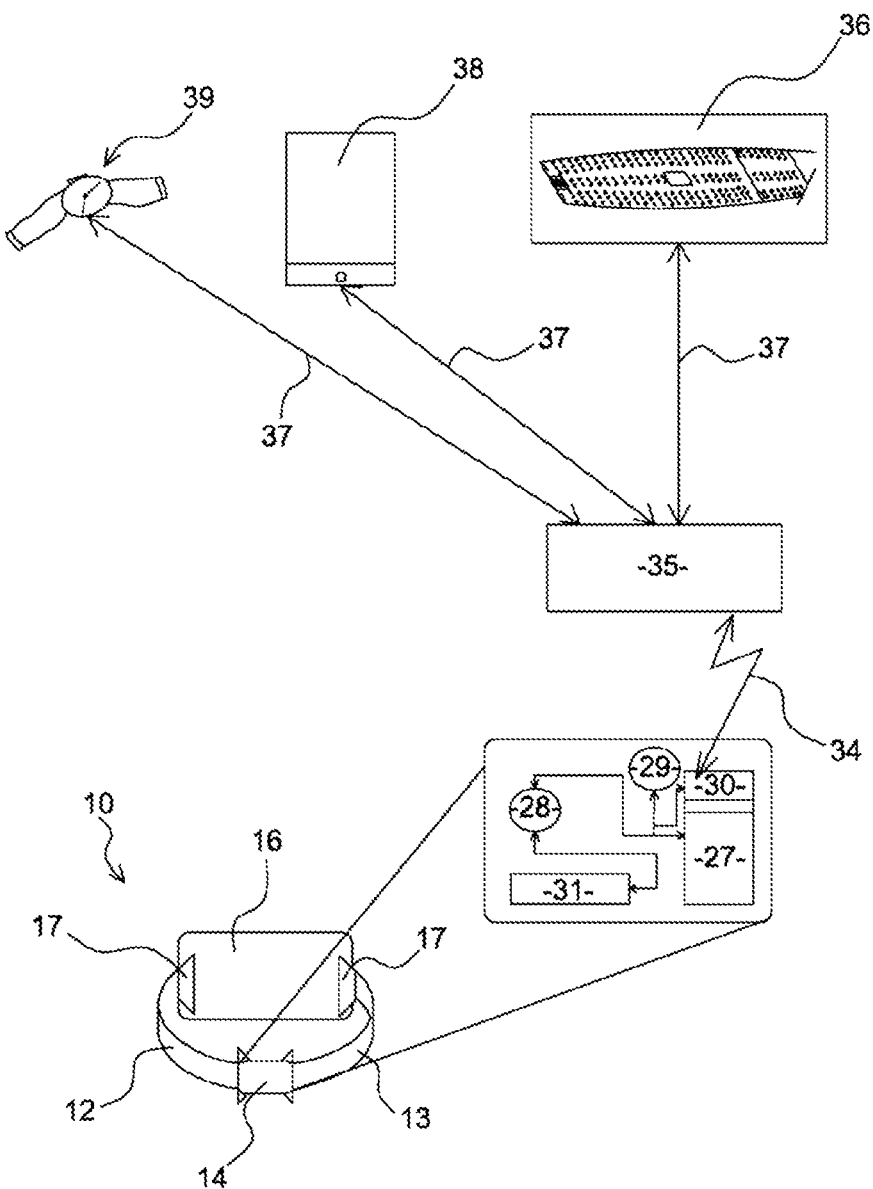
FIG. 1 is a schematic representation of a safety belt according to the present invention, interacting with monitoring devices suitable for use by on-board personnel.

It should be noted that, in the drawings, structural and/or functional elements common to the different embodiments may carry the same references. Thus, unless specified otherwise, such elements have identical structural, dimensional and material properties.

FIG. 1 shows a safety belt 10, notably one intended to be fitted to an aircraft seat, comprising a first part 12 and a second part 13. Preferably, the first part 12 and the second part 13 are capable of being attached to one another, particularly by means of a locking buckle 14. In such an arrangement, the safety belt 10 may be used to retain a passenger in position on a seat on which he is sitting.

Figure 2A:
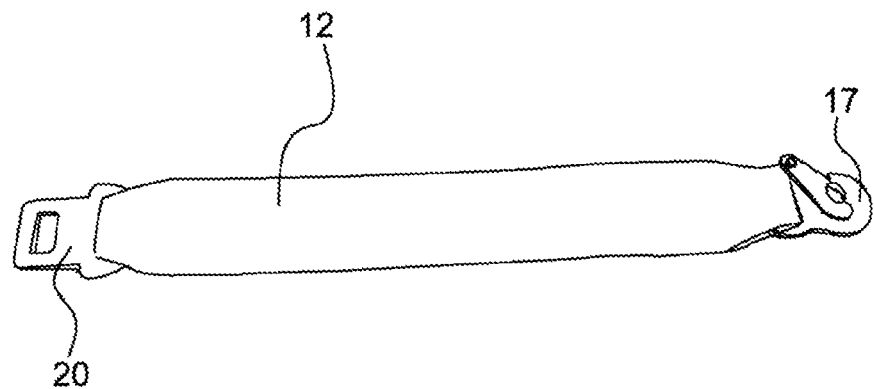
FIGS. 2a and 2b are views of a first and a second part of a safety belt according to the present invention.
Figure 2B:
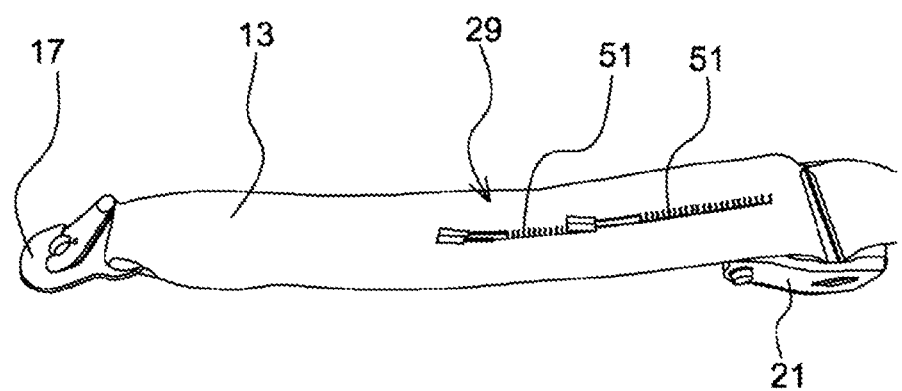

The first part 12 and the second part 13 are made, for example, of a woven material. According to a particular example of embodiment, the first part 12 and the second part 13 are each fastened at one of their ends to a structural element of the seat 16. For this purpose, the first part 12 and the second part 13 each comprise a fastening interface 17, preferably compatible with the existing seats. By way of example, such fastening interfaces 17 are shown in FIGS. 2a and 2b.

At their free ends, the first part 12 and the second part 13 are capable of being joined together, particularly in a temporary way, by means of the locking buckle 14. The locking buckle 14 may be composed of a male element 20, notably in the form of a plate, advantageously perforated, fastened to the free end of the first part 12 or of the second part 13, and a corresponding female element 21 fastened to the other of the second part 13 or the first part 12, notably having a housing for receiving the male element 20, which is, in particular, in the form of a plate.

Figure 3A:
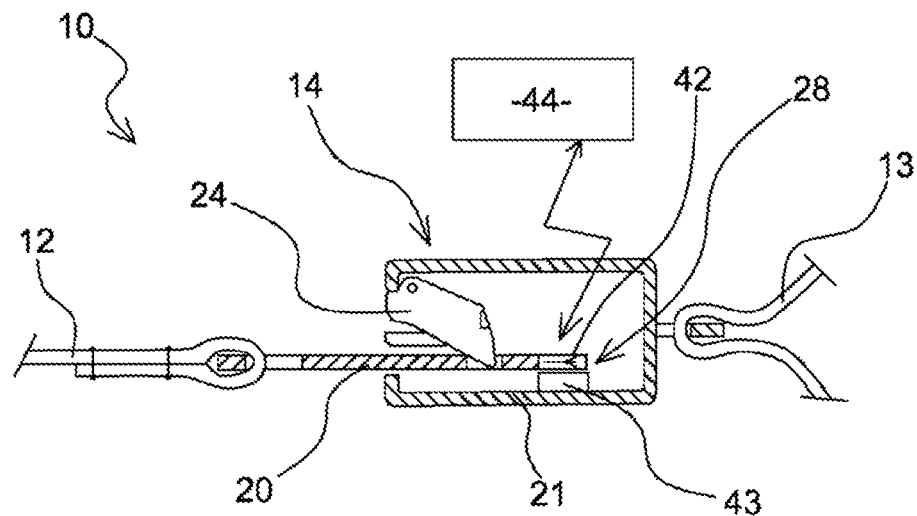
FIGS. 3a and 3b are schematic representations illustrating two variant embodiments of a system for detecting the locking of a safety belt according to the present invention.
Figure 3B:
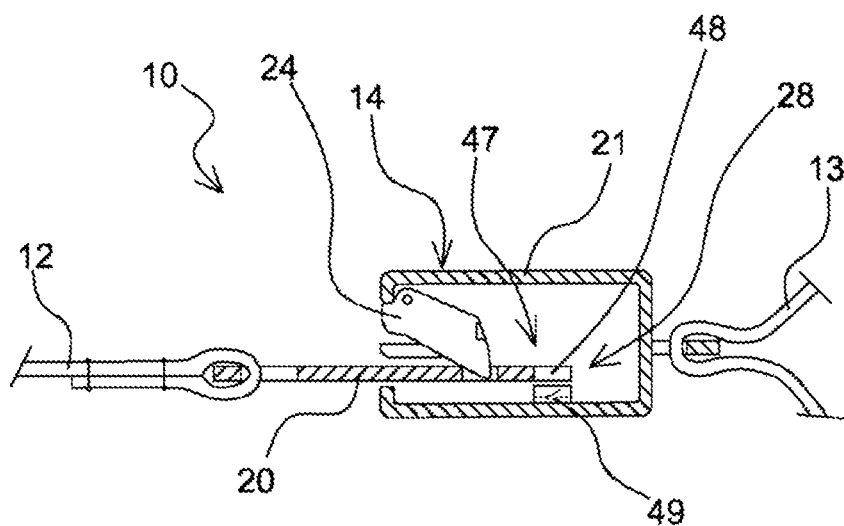

As may be seen in FIGS. 3a and 3b, the locking buckle 14 comprises a latch 24 for locking the male element 20 in the receiving housing of the female element 21. Additionally, the locking buckle 14 advantageously comprises a means for releasing the latch 24, notably a means integrated in the female element 21. According to an example of embodiment, the means for releasing the latch 24 may be actuated manually by the passenger in order to detach the first part 12 from the second part 13 of the safety belt 10.

When the male element 20 and the female element 21 of the locking buckle 14 are attached to one another, the safety belt 10 is said to be in the "locked position".

Conversely, when the male element 20 and the female element 21 are detached from one another, the safety belt 10 is said to be in the "open position".

According to the present invention, the safety belt 10 further comprises a control unit 27, visible in FIG. 1. The control unit 27 may be, according to the example of embodiment shown in FIG. 1, linked to a state detection system 28 for detecting a state of the safety belt 10, notably in the "locked position".

Additionally, the control unit 27 may further comprise a presence detection system 29 for detecting the presence of a passenger encircled by the safety belt 10. The term "encircled" is taken to mean that the belt 10 extends around the passenger's body through an angular sector of less than 360 degrees, for example about 180 degrees, as a result of the fastening of the belt 10 to the seat one either side of the passenger's body.

Finally, the control unit 27 may also comprise a communication module 30, notably a wireless communication module.

The control unit 27 and/or the state detection system 28 and/or the presence detection system 29 and/or the communication module 30 may be supplied by at least one power source 31. Advantageously, the power source 31 is integrated into the safety belt 10. According to a particular embodiment, the power source 31 may take the form of a low-power battery, for example a CR2477 button battery. The belt 10 is thus electrically autonomous.

The control unit 27 and/or the state detection system 28 and/or the presence detection system 29 and/or the communication module 30 and/or the power source 31 are fitted in at least the first part 12 and/or the second part 13 of the safety belt 10.

Alternatively or additionally, the control unit 27 and/or the state detection system 28 and/or the presence detection system 29 and/or the communication module 30 and/or the power source 31 are fitted inside the locking buckle 14.

The communication module 30 is capable of transmitting, notably via a radio link 34, an item of information relating to a state of the safety belt 10 corresponding to the "locked position" and/or to the presence of a passenger encircled by the safety belt 10, that is to say when the passenger is positioned between the buckle and the seat back. Notably, the communication module 30 is capable of transmitting the information to a communications server 35 of the aircraft.

Such an arrangement comprising a communication module 30 thus provides a connected safety belt according to the present invention, capable of transmitting the information relating to a state or status corresponding to it.

According to a particular example of embodiment, the communications server 35 may relay the information to a checking screen 36 for the use of on-board personnel, via a communication link 37.

The checking screen 36 is capable of displaying a seat status (locking/opening of the belt and/or presence/absence of the passenger). In order to comply with the DO-178 standard, the checking screen 36 also preferably displays any fault on the seat which would require manual checking by the on-board personnel. In particular, the fault may be linked to a malfunction of the state detection system 28 and/or the presence detection system 29 and/or of the communication module 30 causing an absence of transmission of the seat status to the on-board personnel.

Preferably, the checking screen 36 is also capable of displaying a location corresponding to the seats of the aircraft according to the status 20 thereof, notably in the take-off, landing and parking phases of the aircraft, as well as in phases of turbulence.

The communication link 37 between the communications server 35 and the checking screen 36 may be a wire link or a wireless link. Alternatively, the information transmitted by the communication module 30 is relayed toward a dedicated portable system 38, of the tablet type for example, toward a connected watch 39, or more generally toward any portable digital device suitable for the application.

For this purpose, preferably, each safety belt 10 is given a unique identification number associated with a seat position in the aircraft. Such an association may be provided automatically or manually via the aircraft network, or by any other means. Additionally, a light and/or sound signal corresponding to the state of the seat may be generated inside a cabin of the aircraft at the seat concerned.

According to a variant embodiment, a visual reminder signal may be broadcast on an entertainment screen placed in the aircraft, to provide a reminder that the safety belt 10 should be currently in the locked position.

More precisely, in the example of embodiment of FIG. 3a, the state detection system 28 of the safety belt 10 may comprise:
- a receiving member 42, for example an antenna, notably arranged in the male element 20 of the locking buckle 14, and
- a transmitting member 43, for example an RFID (for "RadioFrequency Identification" in English), notably arranged in the female element 21 of the locking buckle 14.

Thus, after the male element 20 has been inserted into the female element 21 of the locking buckle 14, the transmitting member 43 associated with the receiving member 42 may generate an item of information relating to the locking of the safety belt 10. Advantageously, the information relating to the locking of the safety belt 10 is then transmitted to the communications server 35.

More particularly, the information relating to the locking of the safety belt 10 is transmitted to a reading unit 44 associated with the communications server 35, particularly following a request sent by the reading unit 44. In a variant, the configuration is reversed: that is to say, the receiving member 42 is integrated into the female element 21 and the transmitting member 43 is integrated into the male element 20.

In the example of embodiment of FIG. 3b, the state detection system 28 is a magnetic switch 47. According to an example of embodiment, the magnetic switch 47 comprises a magnet 48 integrated into the male element 20 and a contactor 49 integrated into the female element 21 of the safety belt 10. Thus, after the male element 20 has been inserted into the female element 21 of the locking buckle 14, the magnet 48 closes the contactor 49. In a variant, the configuration is reversed: that is to say, the magnet 48 is integrated into the female element 21 and the switch 49 is integrated into the male element 20.

The presence detection system 29 for detecting the presence of a passenger encircled by the safety belt 10 is preferably configured to be switched on, that is to say supplied with power, after the locking of the safety belt 10 has been detected by the state detection system 28. Advantageously, the presence detection system 29 is on standby while the safety belt 10 is not in the locked position. Such a configuration enables the power consumption of the safety belt 10 to be minimized.

Figure 4:
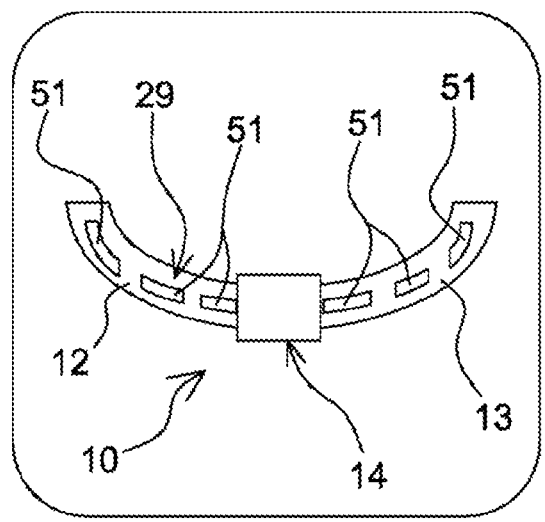
FIGS. 4, 5, 6 and 7 are schematic representations illustrating, respectively, a first, a second, a third and a fourth embodiment of a system for detecting the presence of a passenger for a safety belt according to the present invention.

In the embodiment of FIGS. 2b and 4, the presence detection system 29 comprises at least one sensor 51, which is advantageously flexible. According to a particular embodiment, the sensor 51 is such that it has an electrical resistance that varies as a function of a curvature of the first part 12 and/or the second part 13 of the safety belt 10. For this purpose, use may be made of a single elongated sensor 51, or a plurality of sensors 51 positioned end to end along the safety belt 10.

The presence of a passenger is detected when the electrical resistance of the safety belt 10 corresponding to the curvature of a passenger's body is within a predetermined range of electrical resistance.

The sensor(s) 51 may be positioned
- above the first part 12 and/or the second part 13 of the safety belt 10, that is to say against an outer face of the first part 12 and/or the second part 13 of the safety belt 10, or
- inside a space provided in the first part 12 and/or the second part 13 of the safety belt 10, notably a space provided in the weave of the first part 12 and/or the second part 13 of the safety belt 10.

If the sensor or sensors 51 are positioned above the first part 12 and/or the second part 13 of the safety belt 10, the sensors 51 are advantageously covered with a protective film of fabric or a self-adhesive film made of a plastic or composite material. The composite material may be an assembly of two immiscible components.

Advantageously, the sensor(s) 51 is/are integrated into the first part 12 and the second part 13 of the safety belt 10. Preferably, the sensor(s) 51 is/are integrated and extend(s) over a distance of between 30% and 100%, preferably between 30% and 70%, of the total length of the first part 12 and/or the second part 13 of the safety belt 10.

The sensor(s) 51 is/are made of a piezoresistive material whose electrical resistance varies as a function of a voltage or bending applied to the sensor 51. The characteristics of the sensor(s) 51 (dimensions, temperature ranges, peak consumption, etc.) may be adapted according to the application and type of sensor 51 used.

Figure 5:
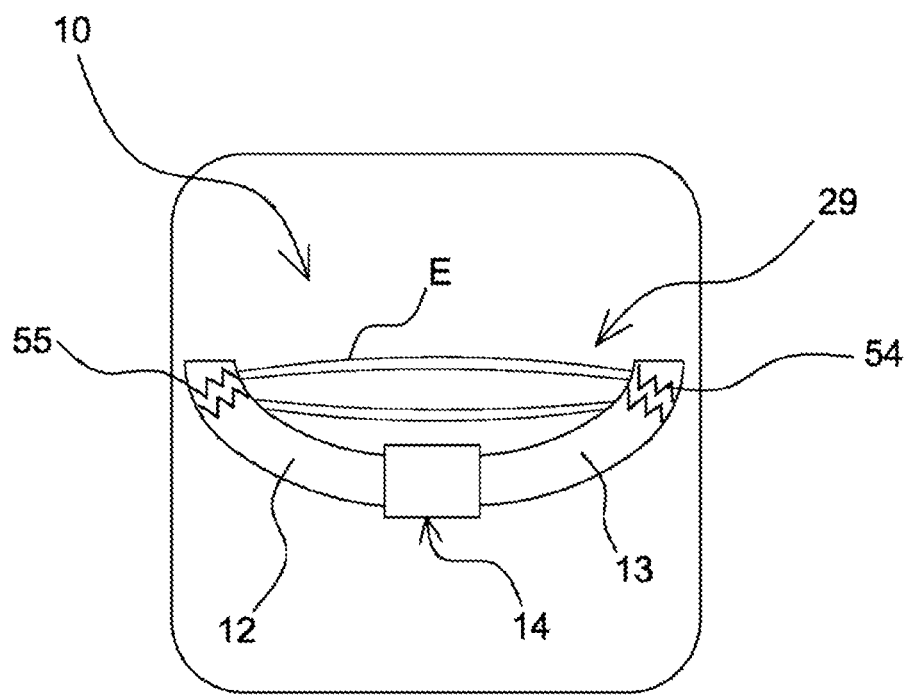

In the embodiment of FIG. 5, the presence detection system 29 comprises a transmitter 54 and a receiver 55, preferably of the radiofrequency type, fitted, respectively, in the first part 12 and/or the second part 13 of the safety belt 10 to generate an electric field E. The passenger's presence is deduced from a detection of impedance within a given range. It will be recalled that the impedance is a measure of the opposition of an electrical circuit to the flow of an alternating current associated with the corresponding electric field. In the present case, the electrical circuit may or may not include the passenger (depending on his presence on the seat). The level of impedance and the presence of the passenger may therefore be deduced from the measured variation of the electric field.

The ranges of impedance measured by the system 29 for the various possible cases (empty seat, seat with an object placed on it, or seat occupied by a passenger) are separated from one another. In an example of embodiment, the empty seat has an impedance of between A1 and B1 kilohms. An object such as a laptop computer placed on the seat has an impedance of between A2 and B2 kilohms. A person present on the seat has an impedance of between A3 and B3 kilohms. The values in the range A1-B1 are greater than the values in the range A2-B2. The values in the range A2-B2 are greater than the values in the range A3-B3. The values of these ranges do not overlap with one another.

Thus the impedance value measured by the presence detection system 29, notably if such an impedance is between A3 and B3 kilohms, enables the presence of a passenger on the seat to be discriminated from the other possible cases. The different impedance ranges may vary as a function of the characteristics of the transmitter 54 and the receiver 55 used, and as a function of the environment of the seat (temperature, air humidity, etc.).

Alternatively, according to another embodiment, a reference signal with a given frequency and amplitude is exchanged between the transmitter 54 and the receiver 55. The presence of a passenger is detected by comparison with a predetermined modified signal. The predetermined modified signal corresponds to an expected variation of amplitude and/or frequency of the reference signal when a passenger is sitting on the seat.

The transmitter 54 and the receiver 55 are located at the ends of the safety belt 10, preferably at a distance of between 5 and 20 centimeters from the fastening interfaces 17. Such an arrangement makes it possible to avoid interference between the signals and the metal portions of any belt worn by the passenger to hold up an item of clothing such as trousers, a skirt, a dress or the like.

The transmitter 54 and the receiver 55 are preferably positioned inside a space provided in the first part 12 and/or the second part 13 of the safety belt 10, notably in the weave of the first part 12 and/or the second part 13 of the safety belt 10. In a variant, the transmitter 54 and the receiver 55 are positioned against an outer face of the first part 12 and/or the second part 13 of the safety belt 10.

Figure 6:
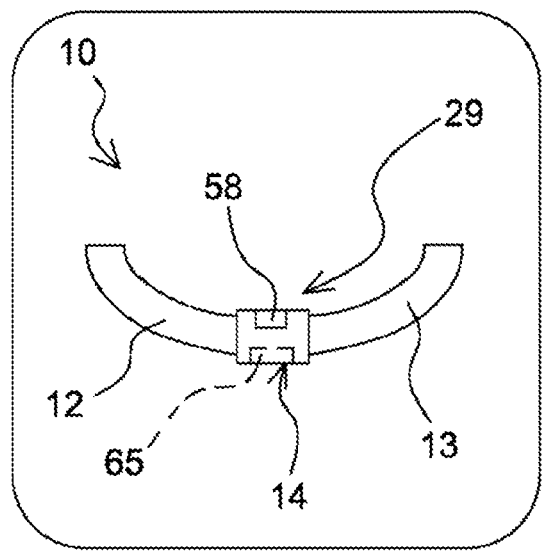

In the embodiment of FIG. 6, the presence detection system 29 comprises an accelerometer 58 which may be integrated into the locking buckle 14 of the safety belt 10.

Figure 8A:
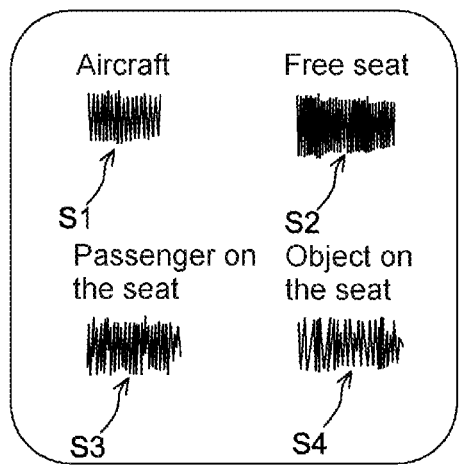
FIG. 8a is a graphic representation of the different types of signals measured by an accelerometer, for an aircraft, a free seat, a seat occupied by a passenger, and a seat on which an object is placed, respectively.
Figure 8B:
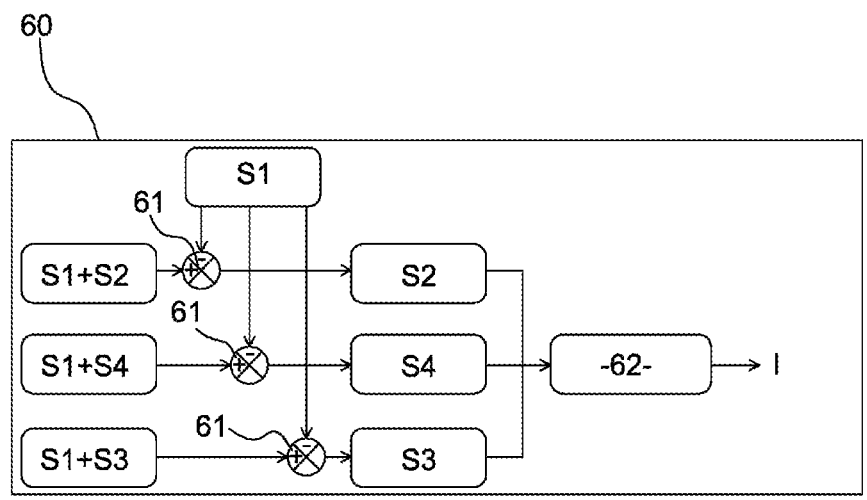
FIG. 8b is a schematic representation of the different functional blocks for the processing of the signals measured by the accelerometers integrated into safety belts according to the present invention.

As illustrated in FIG. 8b, the presence detection system 29 advantageously comprises a processing module 60 for processing signals S1, S2, S3 and S4.

As is apparent in FIG. 8a, the signals S1, S2, S3 and S4 correspond to vibration signatures, and the measurements made by the accelerometer 58 correspond to a combination of these vibration signatures. Thus, the signal acquired by the accelerometer 58 for a free seat corresponds to the vibration signature belonging to the aircraft and the vibration signature of the free seat, that is to say S1+S2. The signal acquired by the accelerometer 58 for a seat occupied by a passenger corresponds to the inherent vibration signature of the aircraft and the vibration signature of the seat occupied by the passenger, that is to say S1+S3. The signal acquired by the accelerometer 58 on a seat on which an object is placed corresponds to the inherent vibration signature of the aircraft and the vibration signature of the seat on which the object is placed, that is to say S1+S4.

According to a particular embodiment, the module 60 subtracts the inherent vibration signature 51 of the aircraft from the signals transmitted by the accelerometers 58 by means of the subtraction blocks 61. The signals S2-S4 from which the aircraft noise has been eliminated in this way are then filtered and compared with one another for a set of seats, for example a column of seats, by means of the functional block 62. For this purpose, the signals from the different safety belts 10 are exchanged via the mesh network detailed below.

An item of information I relating to the presence of a passenger behind a safety belt 10 may be deduced on the basis of this comparison of signals.

The processing of the signals S1, S2, S3 and S4 may be carried out either by the control unit 27 of the safety belt 10 or by a dedicated external computing device.

In combination with such signal processing, it will also be possible to determine an angle formed between the locking buckle 14 and the seat cushion of the seat and/or a horizontal reference frame, for example the cabin floor. This makes it possible to confirm the presence of the passenger encircled by the safety belt 10. This is because the angle is substantially zero when the locking buckle 14 rests on the seat cushion, but is different when the locking buckle 14 rests on the passenger, owing to the curvature assumed by the safety belt 10 to conform to the passenger's body. To make this angle measurement more reliable, the accelerometer 58 may be coupled to a rate gyroscope 65.

Figure 7:
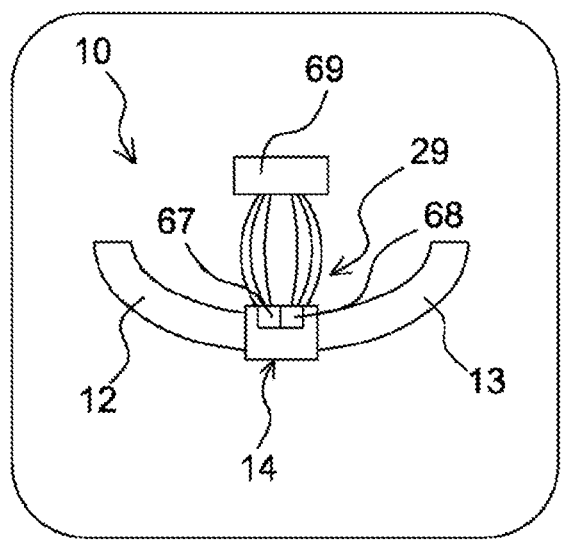

In the embodiment of FIG. 7, the presence detection system 29 comprises a transmitter 67 and a receiver 68, notably of the radiofrequency type, fitted in the locking buckle 14. The receiver 68 receives a magnetic field reflected by a back 69 of the seat, made of a metal material. The magnetic field measurement made by the receiver 68 varies according to the object located between the locking buckle 14 and the seat back. The various possible cases (empty seat, seat with an object placed on it, or seat occupied by a passenger) can be discriminated on the basis of the different ranges of magnetic field measurement.

This is because the magnetic field ranges measured by the system 29 for the various possible cases are dissociated from one another. In an example of embodiment, the magnetic field measured by the receiver 68 for an empty seat is between A1' and B1' tesla. The magnetic field measured by the receiver 68 for an object, such as a laptop computer, placed on the seat is between A2' and B2' tesla. The magnetic field measured for a person sitting on the seat is between A3' and B3' tesla. The values of these ranges do not overlap with one another. Thus a magnetic field value measured by the receiver system 68, notably if this value is between A3' and B3' tesla, enables the presence of a passenger on the seat to be discriminated from the other possible cases. The different magnetic field ranges may vary as a function of the characteristics of the transmitter 67 and the receiver 68 used, and as a function of the environment of the seat (temperature, air humidity, etc.).

In an example of embodiment, the receiver 68 may, for example, be a Hall effect sensor, while the transmitter 67 may take the form of an antenna emitting an electromagnetic field.

Preferably, the communication module 30 is a low-consumption module incorporating a power management strategy for turning the various components of the module on and off so as to minimize its power consumption. Additionally, the communication module 30 uses standard communication protocols which also limit its power consumption.

Advantageously, the communication module 30 is part of a mesh network, so that it can, notably, transmit information from an adjacent safety belt 10 whose communication module may have been damaged. This enables secure, redundant network communication to be established within the aircraft cabin. Additionally, in the embodiment of FIGS. 6 and 8a-8b, the mesh network is used to exchange the various vibration signals S2, S3, S4 measured by the accelerometers 8. It will be recalled that, in a mesh network, each element forming part of the network may be used to extend the range of the mesh network to the elements surrounding it. Additionally, each element may receive and transmit information to the neighboring elements, without going via a monitoring element as would be the case in other types of network. Preferably, the communication module 30 implements an IEEE 802.15 standard communications protocol, notably IEEE 802.15.4-2015. According to an example of embodiment, the communication speed is between 20 kbps and 240 kbps, and the range may be up to 100 m. These data are given for a network on the ground. In an aircraft, the cabin acts as a Faraday cage, thus improving the network performance.

It should be noted that the safety belt 10 may be installed as original equipment, during manufacturing and installation operations for aircraft seats before any use, or as an aftermarket component, during maintenance operations for aircraft seats that are in use.

The safety belt 10 may be adapted to a three-point safety belt having an additional fastening area at the level of the passenger's shoulder. The safety belt 10 is also compatible with safety belts incorporating airbags.

The safety belt 10 may be associated with a second safety belt adapted for retaining an infant, a passenger with reduced mobility, or any other particular type of passenger. The link between the two safety belts may be made by a quick fastening system.

The improvements that may be made to the safety belt 10 described above are detailed below.

In some configurations, the communication module 30 may communicate with a multimedia system associated with the seat (or IFE system, for "In Flight Entertainment System" in English), by displaying a message asking the passenger to buckle his safety belt 10. When the message is displayed, the current video and/or music broadcasts may be interrupted.

The safety belt 10 may also incorporate an additional function for capturing the passenger's brain activity in order to detect the passenger's phases of wakefulness or sleep. For this purpose, the safety belt 10 may incorporate sensors for measuring physiological data concerning the passenger, such as his heart rate, breathing, etc. The physiological data measurement sensors may also be used to confirm the presence of the passenger encircled by the safety belt 10.

The safety belt 10 may be made from a standard textile or a textile incorporating additional components, such as light guides. By using such light guides it is possible, notably, to indicate a locking state of the safety belt 10 by the color of the light of the light guide. As a variant or additionally, the textile may comprise electrical wiring for conducting an electrical signal.

The safety belt 10 may also be made of a material which is flexible, antibacterial and easily cleaned.

A motorized roller may also be incorporated to tension the safety belt 10 around the passenger's body.

Clearly, the invention is not limited to the embodiments described above, which are provided solely by way of example. It incorporates various modifications, alternative forms and other variants which could be devised by a person skilled in the art in the context of the present invention, and notably all combinations of the modes of operation described above, considered separately or in combination.

The invention claimed is:

1. A safety belt to be installed on an aircraft seat, comprising a first part and a second part that can be attached to one another by means of a locking buckle to retain a passenger on the seat, the safety belt further comprising at least one of:
   a state detection system, capable of transmitting an item of information relating to a locking state of the safety belt;

a presence detection system comprising at least one sensor, wherein the presence detection system is capable of transmitting an item of information relating to the presence of a passenger encircled by the safety belt; and a wireless communication module capable of transmitting an item of information relating to at least one of the locking of the safety belt and the presence of a passenger encircled by the safety belt, wherein an electrical resistance of the at least one sensor varies as a function of a curvature of at least one of the first part and the second part of the safety belt.

2. The safety belt of claim 1, comprising a power source so as to be electrically autonomous.

3. The safety belt of claim 1, wherein at least one of the state detection system for detecting the locking state of the safety belt, the presence detection system, and the wireless communication module are fitted in at least one of the first part, the second part of the safety belt, and inside the locking buckle of the safety belt.

4. The safety belt of claim 1, wherein the presence detection system is configured to be switched on after the detection of the locking of the safety belt.

5. The safety belt of claim 1, wherein the sensor is positioned in a space provided in a weave of at least one of the first part and the second part of the safety belt.

6. The safety belt of claim 1, wherein the sensor is integrated into at least one of the first part and the second part of the safety belt.

7. The safety belt of claim 1, wherein the sensor extends over a distance of between 30% and 100% of a total length of at least one of the first part and the second part of the safety belt.

8. The safety belt of claim 1, wherein the sensor is made of a piezoresistive material.

9. The safety belt of claim 1, wherein the presence detection system comprises a transmitter and a receiver fitted, respectively, in the first part and/or the second part of the safety belt to generate an electric field.

10. The safety belt of claim 9, wherein the transmitter and the receiver are located at the ends of the safety belt.

11. The safety belt of claim 10, wherein the transmitter and the receiver are located at a distance of between 5 cm and 20 cm from fastening interfaces for fastening the safety belt to a seat structure.

12. The safety belt of claim 9, wherein the transmitter and the receiver are positioned in a space provided in a weave of at least one of the first part and the second part of the safety belt.

13. The safety belt of claim 1, wherein the presence detection system comprises at least one accelerometer.

14. The safety belt of claim 13, wherein the accelerometer is integrated into the locking buckle.

15. The safety belt of claim 13, wherein the presence detection system comprises a module for comparing signals transmitted by the accelerometer for a free seat, a seat on which an object is placed, and a seat occupied by a passenger, from which an inherent vibration signature of the aircraft in operation has previously been subtracted.

16. The safety belt of claim 13, wherein the accelerometer is coupled to a rate gyroscope for the additional measurement of an angle formed between the locking buckle and at least one of a seat cushion of the seat and a horizontal reference frame.

17. The safety belt of claim 1, wherein the presence detection system comprises a transmitter and a receiver fitted in the locking buckle, the receiver being capable of receiving a magnetic field reflected by a back of the seat, which is made of a metal material.

18. The safety belt of claim 1, wherein the wireless communication module is a low-consumption module incorporating a power management strategy for switching various components of the wireless communication module on and off so as to minimize its power consumption.

19. The safety belt of claim 1, wherein the wireless communication module forms part of a mesh network.

20. The safety belt of claim 1, wherein the locking buckle comprises a male element and a female element, and in that the state detection system of the safety belt comprises:
a receiving member arranged in the male element or the female element, respectively, of the locking buckle; and
a transmitting member arranged in the female element or the male element, respectively, of the locking buckle.

21. The safety belt of claim 20, wherein the transmitting member is an RFID chip.

22. The safety belt of claim 1, wherein the state detection system comprises a magnetic switch.

23. The safety belt of claim 22, wherein the magnetic switch comprises:
a magnet integrated into a male element or a female element, respectively, of the locking buckle; and
a contactor integrated into the female element or the male element, respectively, of the locking buckle.

24. A safety belt to be installed on an aircraft seat, comprising a first part and a second part that can be attached to one another by means of a locking buckle to retain a passenger on the seat, the safety belt further comprising at least one of:
a state detection system, capable of transmitting an item of information relating to a locking state of the safety belt;
a presence detection system capable of transmitting an item of information relating to the presence of a passenger encircled by the safety belt; and
a wireless communication module capable of transmitting an item of information relating to at least one of the locking of the safety belt and the presence of a passenger encircled by the safety belt,
wherein the presence detection system comprises a transmitter and a receiver fitted, respectively, in the first part and/or the second part of the safety belt to generate an electric field.

25. A safety belt to be installed on an aircraft seat, comprising a first part and a second part that can be attached to one another by means of a locking buckle to retain a passenger on the seat, the safety belt further comprising at least one of:
a state detection system, capable of transmitting an item of information relating to a locking state of the safety belt;
a presence detection system capable of transmitting an item of information relating to the presence of a passenger encircled by the safety belt; and
a wireless communication module capable of transmitting an item of information relating to at least one of the locking of the safety belt and the presence of a passenger encircled by the safety belt,
wherein the presence detection system comprises at least one accelerometer.

* * * * *